United States Patent
Kraeutle

(10) Patent No.: US 9,578,974 B2
(45) Date of Patent: Feb. 28, 2017

(54) SLATTED BASE HAVING A FRAME AND A MEASURING DEVICE

(71) Applicant: DOC AG, St. Gallen (CH)

(72) Inventor: Martin Kraeutle, Hechingen (DE)

(73) Assignee: DOC AG, St. Gallen (CH)

( * ) Notice: Subject to any disclaimer, the term of this patent is extended or adjusted under 35 U.S.C. 154(b) by 0 days.

(21) Appl. No.: 14/995,375

(22) Filed: Jan. 14, 2016

(65) Prior Publication Data

US 2016/0235208 A1    Aug. 18, 2016

(30) Foreign Application Priority Data

Jan. 16, 2015   (DE) .................. 10 2015 000 278

(51) Int. Cl.
| | |
|---|---|
| *A47C 23/06* | (2006.01) |
| *A47C 19/02* | (2006.01) |
| *A47C 31/12* | (2006.01) |
| *G01B 5/30* | (2006.01) |

(52) U.S. Cl.
CPC .......... *A47C 19/027* (2013.01); *A47C 23/063* (2013.01); *A47C 23/067* (2013.01); *A47C 31/123* (2013.01); *G01B 5/30* (2013.01)

(58) Field of Classification Search
CPC ....................................................... A47C 23/06
USPC .................................... 5/236.1, 239–241, 11
See application file for complete search history.

(56) References Cited

U.S. PATENT DOCUMENTS 5,075,912 A  *  12/1991  Elmalek ............... A47C 23/067
                                                     5/11

FOREIGN PATENT DOCUMENTS

| | | |
|---|---|---|
| DE | 10111585 | 7/2002 |
| EP | 0141260 | 5/1985 |
| EP | 0344062 A1 | 11/1989 |
| EP | 1820423 | 8/2007 |
| EP | 2572607 | 3/2013 |
| EP | 2575607 A1 | 4/2013 |
| WO | 2012052972 A1 | 4/2012 |

* cited by examiner

*Primary Examiner* — Fredrick Conley
(74) *Attorney, Agent, or Firm* — Browdy and Neimark, PLLC

(57) ABSTRACT

A slatted base having a frame and a measuring device for detecting the deformation of a lying surface under the load of a person lying thereon, wherein the deformation is carried out by detecting the vertical deflection of slats, which are held on both sides in a slatted base with their free ends in a mounting body, on which the displaceable end of a vertically oriented lifting drive engages, which is supported with respect to a bottom-side base frame, wherein the mutual horizontal distances between the slats is adjustable and fixable.

8 Claims, 7 Drawing Sheets

SLATTED BASE HAVING A FRAME AND A MEASURING DEVICE

FIELD

The invention relates to a slatted base comprising a frame and a measuring device for detecting the deformation of a lying surface under the load of a person lying thereon.

BACKGROUND

Such an arrangement of a slatted base has become known, for example, as the subject of EP 2 572 607 B1.

The document described a slatted base in which at least some of the slats interact with a deformation sensor, and the output signals of the deformation sensors are supplied to a computer in order to determine, in dependence on the total weight of the user, a load distribution on the slats, the deflection of the slats, the tilting of the slats with respect to the frame axis and the tilting of the slats along their longitudinal axis, as well as the center of gravity of the user and the presence of a lateral, supine or prone position.

It is further known from this document that each pair of slats is held in an associated spring-loaded bearing element and that the bearing element is arranged on the frame of the measurement bed such that it can be electromotively raised and lowered.

Each bearing element, which accommodates either one or two slats, is accordingly allocated a servomotor, which drives a lifting drive via an angular gear, which is suitable for driving the bearing element in the vertical direction such that the bearing element can be raised and lowered.

With this kind of lifting drive of the slats via bearing elements, which are driven by a servomotor such that they can be raised and lowered, a specific target position of the lying surface is determined. This means that in order to produce a particular target position of the lying surface, all bearing elements are driven such that, for example, one slat lies slightly higher above the other slat, so as to create a particular lying profile on the lying surface.

One first departs from an initially established base position, which first consists of a completely flat lying surface which aligns all of the slats in a flat, horizontal position.

After the creation of this base position, in the unloaded state, a subject lies on the lying surface and then a contactless measurement of the deflection of the slats and the path of deflection within the spring body itself occurs in nearly every slat in order to determine the sinking depth of every slat with respect to the base position of the lying surface.

In this way, a lying profile of the loaded lying surface is created, which indicates at what body weight at which part of the body the respective slat flexes downward and sinks, and this distance is determined by said contactless measurement.

One thus determines a target sinking of the lying surface, namely with respect to the deflection and the spring deflection of the slats or the slat pairs, in that one converts these values to the bearing points of the bearing elements of the longitudinal beams of the lying surface.

If, for example, a sinking depth in the middle of the slat of, for instance, 5 cm is measured, this is converted with a conversion scale, e.g. 1:10 or 1:9 to the longitudinal beam side bearing element, which is then assigned a displacement of, for example, 1 cm from the lifting drive.

If, for example, a longitudinal displacement of the slat in the center region of the lying surface of 50 mm is determined, this is converted in a grid dimension scale, e.g. in a grid dimension of 1:10, and a corresponding lift adjustment is carried out on the longitudinal beam side bearing element, e.g. by a displacement of 5 mm.

A particular target profile is thus created through the lifting drives in dependence on the determined measurement values of each slat pair of the lying surface, in that each bearing element is raised or lowered on the longitudinal beam side so as to achieve that finally, the spine of the subject is in a straight alignment on the lying surface.

This means that the orientation of the bearing elements via the lifting drive arranged there leads to an ergonomically correct alignment of the lying surface with the goal of defining certain lying zones, so as to enable a continuously straight spine.

In known lifting drives, which are arranged at a mutual distance and in parallel to the longitudinal beams of the measurement bed, the lying profile is then steplessly adjusted in the manner of a target profile.

For reasons of simplification and for the improvement of the later usability of a user bed derived therefrom, it is provided that a particular grid dimension is derived from the stepless adjustment of the bearing elements which support the slats, and this grid dimension is later adjusted precisely to a slatted base assigned to a user.

Thus, in a later lying surface which is individually aligned to the user, the displacement positions of the individual bearing elements, which have been previously determined via the measurement arrangement of the measurement bed, are converted into assigned grid spacings from mutually displaceably arranged bearing elements, in order to thus enable a particular grid dimension of a lifting setting of a slatted base which is individually adapted to a user from the stepless lifting drive of the measurement bed.

As each lifting drive is individually adjustable for each slat, one has determined an individual lying profile, which is the object of EP 2 572 607 B1.

The disadvantage of said document is, however, that only one (vertical) lifting drive is shown for the individual adjustment of the slats, however no other adjustment possibilities are shown.

SUMMARY

The object of the invention is therefore to develop a slatted base with a frame and a measuring device according to the object of EP 2 572 607 B1 such that expanded adjustment and fixing possibilities are provided.

To achieve this object, the invention is characterized by the provision of a slatted base having a frame and a measuring device for detecting the deformation of a lying surface under the load of a person lying thereon, wherein the deformation is carried out by detecting the vertical deflection of slats, which are held on both sides in a slatted base with their free ends respectively in a mounting body, on which the displaceable end of a vertically oriented lifting drive engages, which is supported with respect to a bottom-side base frame, wherein the mutual horizontal distances between the slats is adjustable and fixable.

A feature of the invention is also that the bearing elements which support the slats are formed in an adjustable and fixable manner in the horizontal longitudinal direction with respect to the longitudinal beams.

There results from the provided technical teaching the advantage that an expanded area of use is provided with respect to the subject of EP 2 572 607 B1, as in this document it was not possible to adjust the mutual distance of mutually adjacent slats. The invention provides this for the first time, and has the advantage through the individual adjustment of the horizontal distances of mutually adjacent slats that specific zones on the lying surface can now be defined.

Each zone is characterized by an individual horizontal distance of the slats respectively arranged there.

Using the example of a lordosis zone, for example, it can be specified that the slats have a mutual distance of 10 to 15 mm in the lordosis zone, and at the end of the lordosis zone a greater distance between the slats which adjoin there is chosen, which then define the adjoining pelvic zone.

For example, the distance between the end of the lordosis zone and the beginning of the pelvic zone may now be adjusted to a horizontal slat distance of 20 mm, and all further slats which are associated with the lordosis zone then have a greater horizontal distance of, for example, 25 mm.

In this way, individual zones may be defined in a distributed manner across the longitudinal direction of the lying surface, which was not possible in the subject of EP 2 572 607 B1.

In a first preferred embodiment of the invention, it is provided that the mutual horizontal spacing of mutually adjacent slats can be adjusted by hand.

In this embodiment, it is preferred that the slats are received in a bearing element having an insertion pocket for the respective end of the slat.

For the sake of simplified description, it is assumed in the following description that each of the slats are held in pairs in a single bearing element and that each bearing element has an insertion pocket, so that each pair of slats is held in a single bearing element and the bearing element is associated with a single lifting drive.

The invention is not limited in this regard, as in other embodiments it may be provided that a plurality of slats, e.g. 3 or 4, may be accommodated in a bearing element having corresponding insertion pockets, and this bearing element is respectively associated with a lifting drive.

In another embodiment, it can also be provided that in each case only a single slat is received in the insertion pocket of a bearing element, and this bearing element is respectively associated with a lifting drive.

It is assumed in the following description only for the sake of simplified description that slats which are respectively arranged in pairs are held in a bearing element and this bearing element is associated with a vertical lifting drive. However, this should not be understood as limiting for the present invention.

In this preferred embodiment is therefore proposed according to the invention a horizontal displacement by hand of the bearing elements in the associated lifting drive. The horizontal displacement by hand takes place in that a pin pointing in the horizontal direction is provided on the bearing element, said pin displaceably engaging in an associated horizontally oriented longitudinal guide of a guide block, wherein the guide block is a part of the lifting drive and, due to the lifting drive, can be raised and lowered.

The invention also claims the kinematic reversal of this arrangement, in which the longitudinal guide is in the bearing element and the pin is mounted in or on the lifting drive.

In another embodiment of the invention, it may be provided that instead of the manual horizontal displacement of the individual bearing elements in the associated guide block of the lifting drive, an electromechanical or electromotive displacement now takes place. Here is then used, for example, a spindle drive or the like, which is arranged in the guide block of the lifting drive and which forms the entire bearing element in a displaceable and fixable manner in a horizontal direction parallel to the longitudinal extent of the longitudinal beam.

To adjust the horizontal distance between the individual slats, a zero position is initially set, which is repeatably displayed by means of a position indicator which is fixed to the frame.

The lifting adjustment at the bearing element is achieved in that the bearing element with its spring body placed thereon is connected to a grid plate, which is height-adjustably lockable on an oppositely arranged clipping plate. With a clipping plate which can be fixed on the frame side, the grid plate forms a vertical longitudinal guide which can be locked with a locking element at a certain height adjustment.

In the case of a subject lying on the lying surface, the individual horizontal distance of the slat pairs is now determined, in that one displaces the frame-side position indicator with respect to the oppositely positioned scale on the horizontally displaceable mounting body by, for example, 5 mm, and reads the number which is determined there.

Thereafter, the subject leaves the lying surface and a displacement by hand of the respective mounting body in the horizontal direction is then performed, until the scale value which was previously determined via the position indicator is reset to zero.

The respective mounting body is thus individually displaced in a horizontal direction with an unloaded lying surface together with the oppositely-placed clipping plate which is held together in a vertical longitudinal guide.

An advantage of the indicator system is that it enables a repeatable reading of scale values and, based on the read scale values, then executes a displacement by hand or electromotorically of the individual mounting body in the horizontal plane.

The inventive subject of the present invention arises not only from the subject of the individual claims but also from the combination of the individual claims with one another.

All information and features disclosed in the documents, including the abstract, in particular the spatial embodiment shown in the drawings, are claimed as essential to the invention insofar as they are novel with respect to the prior art, either individually or in combination.

BRIEF DESCRIPTION OF THE DRAWINGS

The invention is hereinafter described in greater detail with reference to drawings showing only one possible embodiment. From the drawings and their description follow further features and advantages essential to the invention.

DETAILED DESCRIPTION

Figure 1:
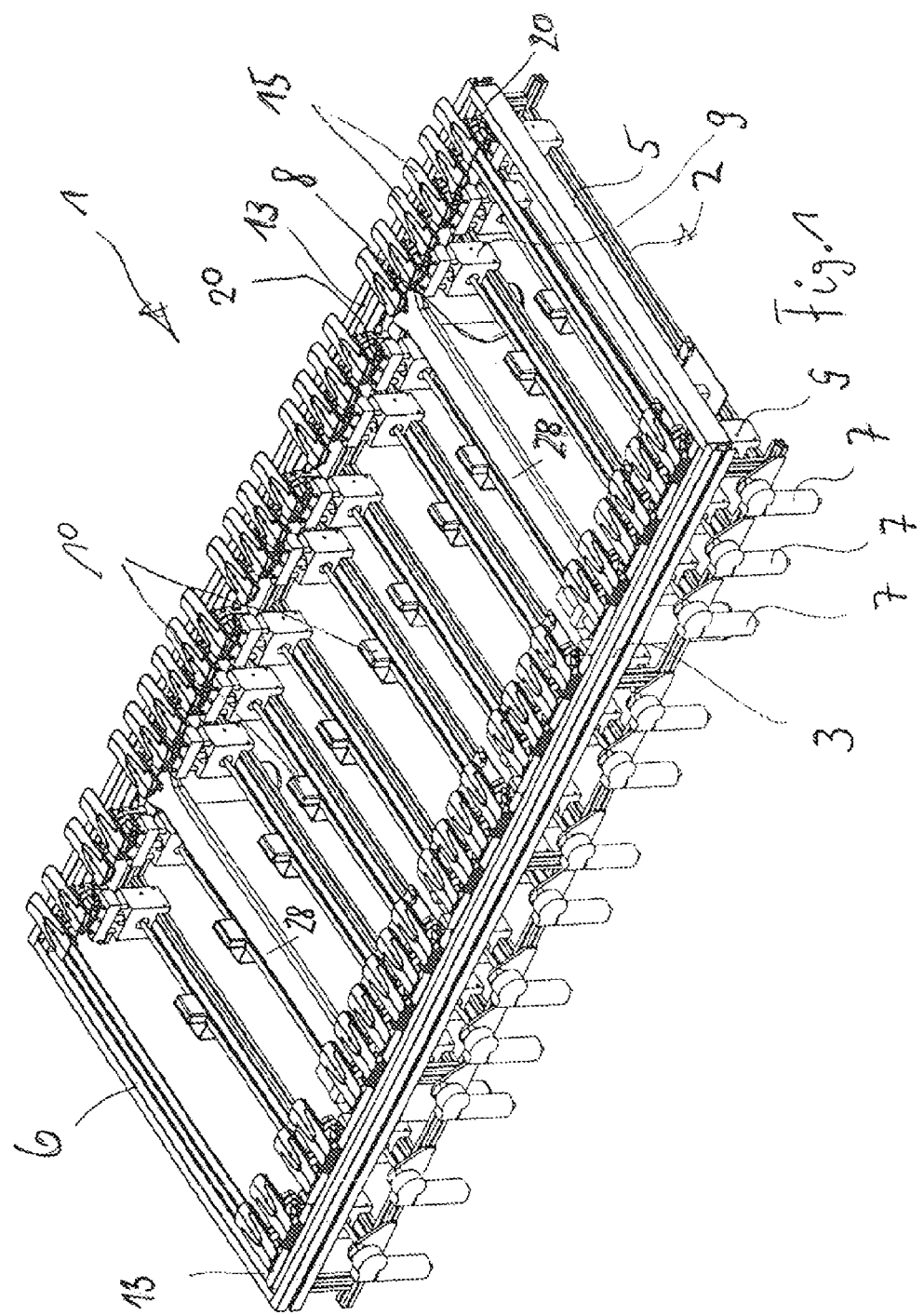
FIG. 1: shows a perspective top view of a measurement bed according to the invention.
Figure 2:
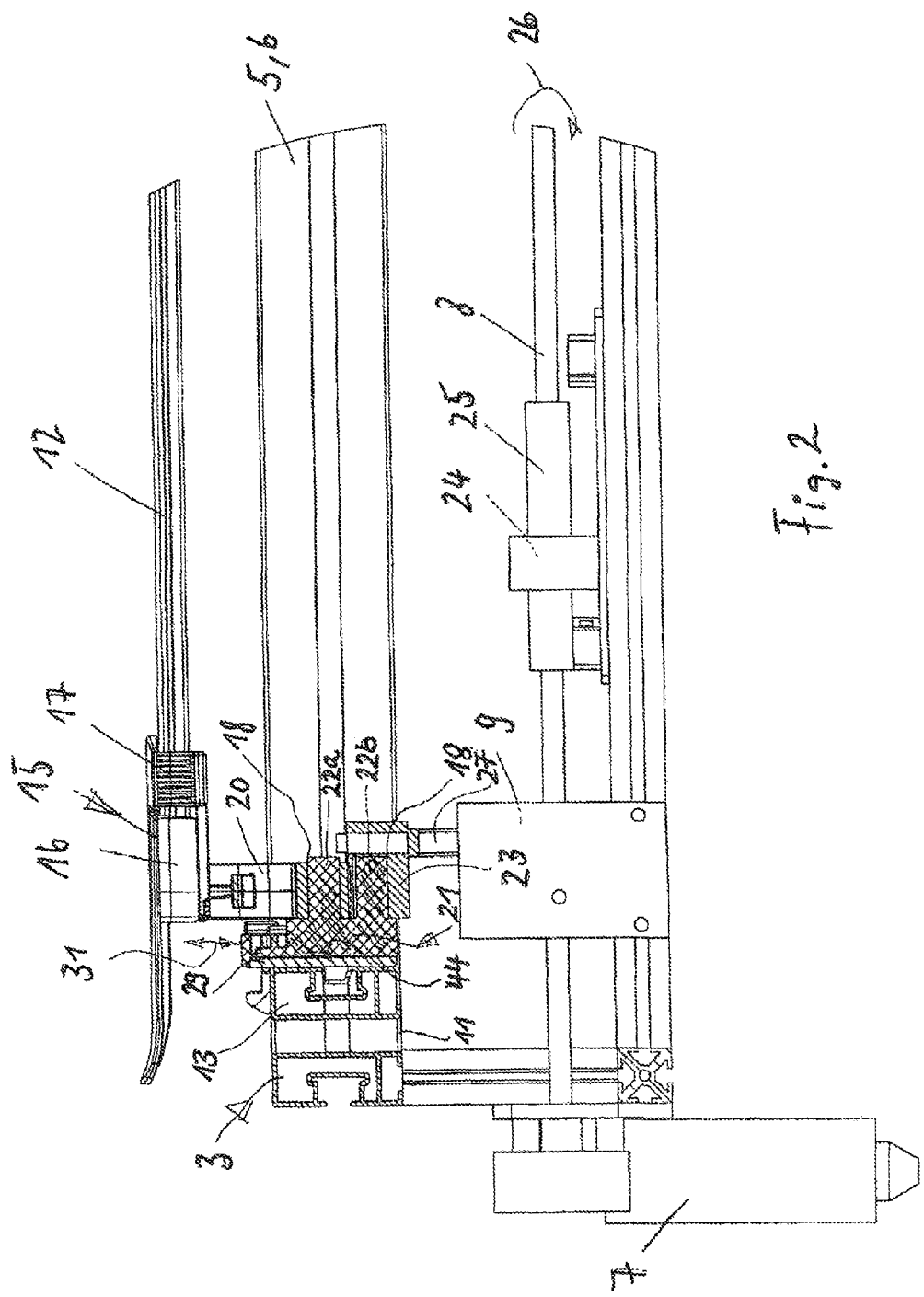
FIG. 2: shows an enlarged cross-section through the left side of the measurement bed of FIG. 1.
Figure 3:
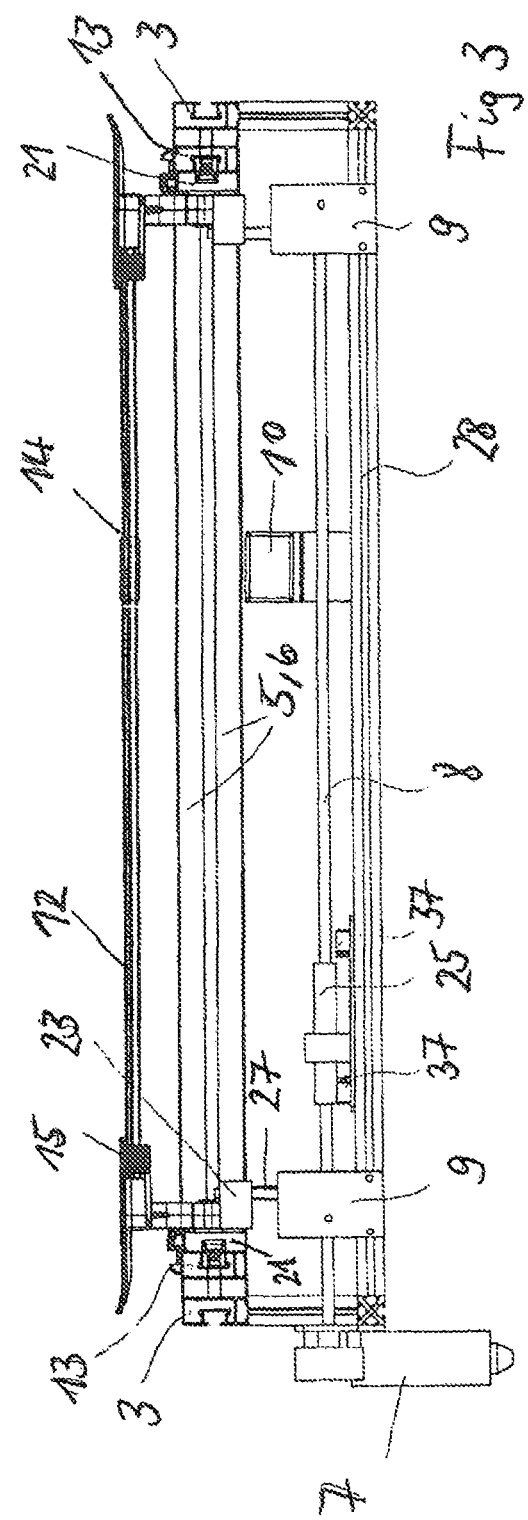
FIG. 3: shows a cross-section through the measurement bed of FIG. 1 over the entire width.

In the FIGS. 1 to 3 is generally shown a measurement bed 1, which substantially comprises a bottom-side base frame 2 having longitudinal beams 52 which are arranged at a mutually parallel distance, which are respectively braced in the transverse direction thereto by means of transverse braces 28, and on the longitudinal beams 52, vertically aligned struts 53 are respectively arranged at a mutual distance, which as a whole carry the measurement frame.

The measurement frame comprises outer longitudinal beams 3, which are respectively supported on their end faces by means of transverse beams 5, 6, wherein the outer longitudinal beams 3 are associated with inner longitudinal beams 13.

Figure 6:
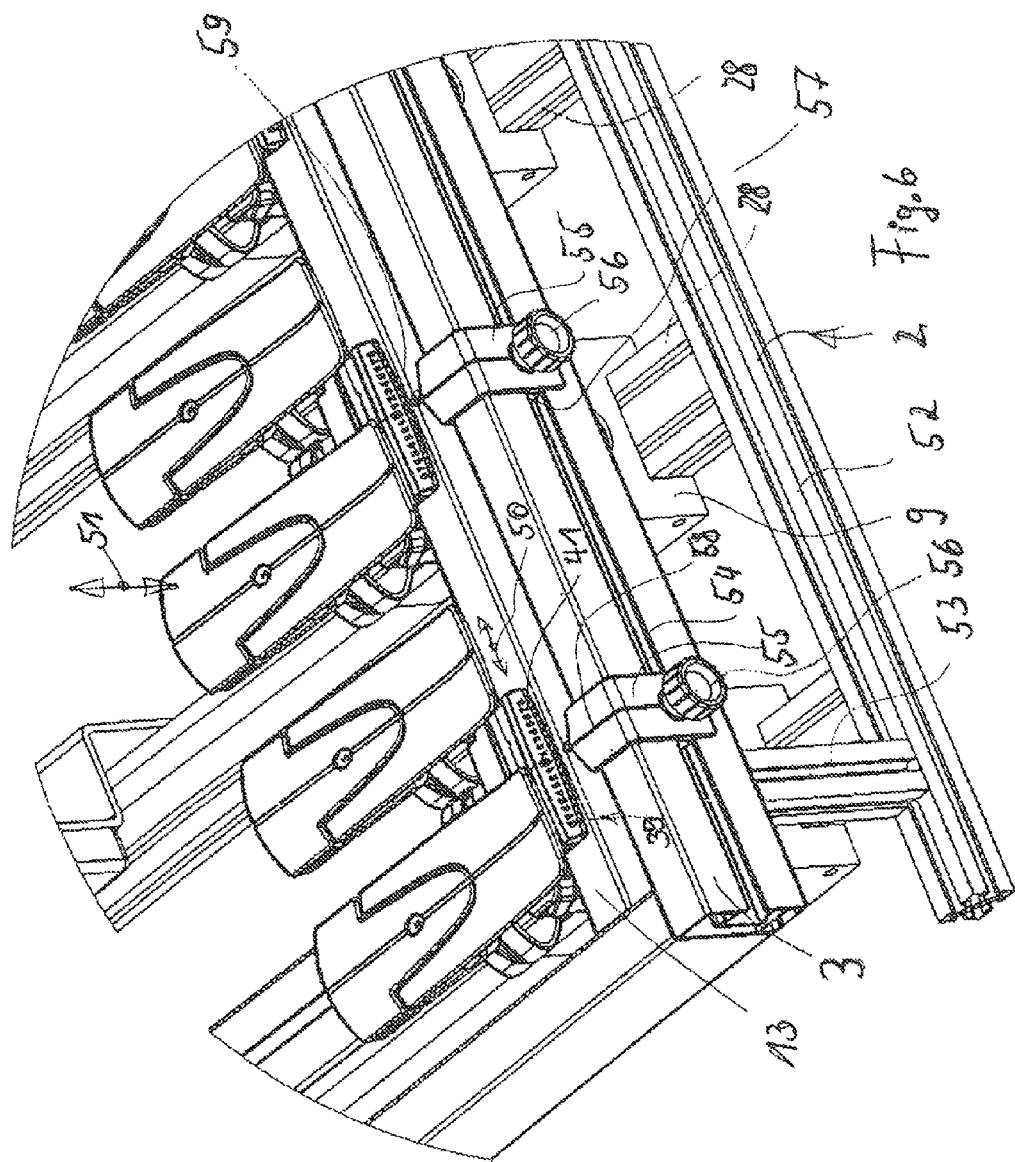
FIG. 6: shows the top view of the measurement bed with the position indicator system.

A respective servomotor 7—see FIG. 6—is positioned on each transverse brace 28, which in each case executes the lifting drive of the bearing elements 15 of the slats 12.

A servomotor 7 is thus provided for each pair of slats 12, which is respectively arranged on the side of the longitudinal beam 52 in the region of a transverse brace 28.

According to FIGS. 1 to 3, each servomotor 7 rotationally drives a drive shaft 8, which extends through an angular gear 9.

Figure 4:
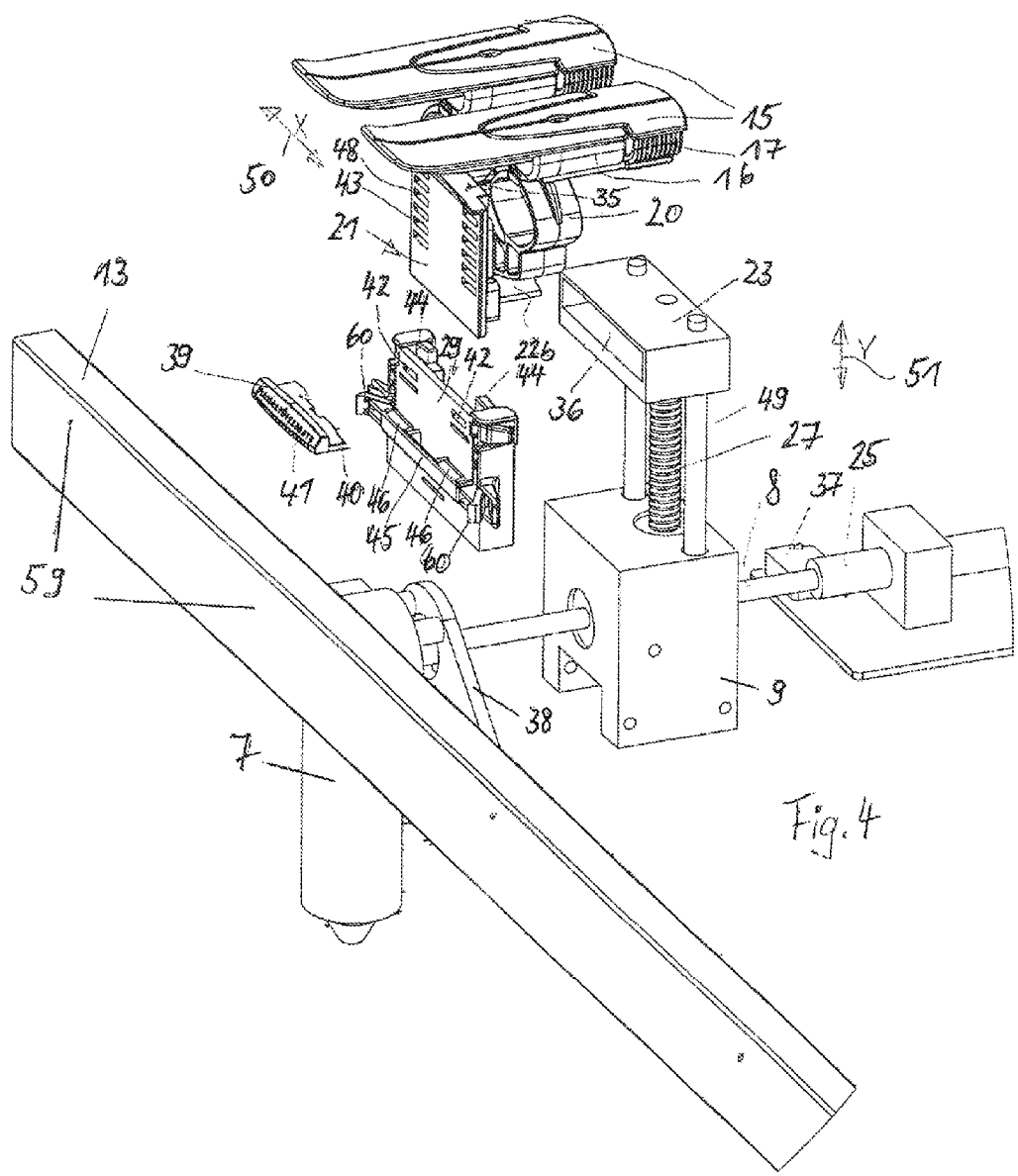
FIG. 4: shows an exploded view of the individual elements of the measurement bed on the left side.
Figure 5:
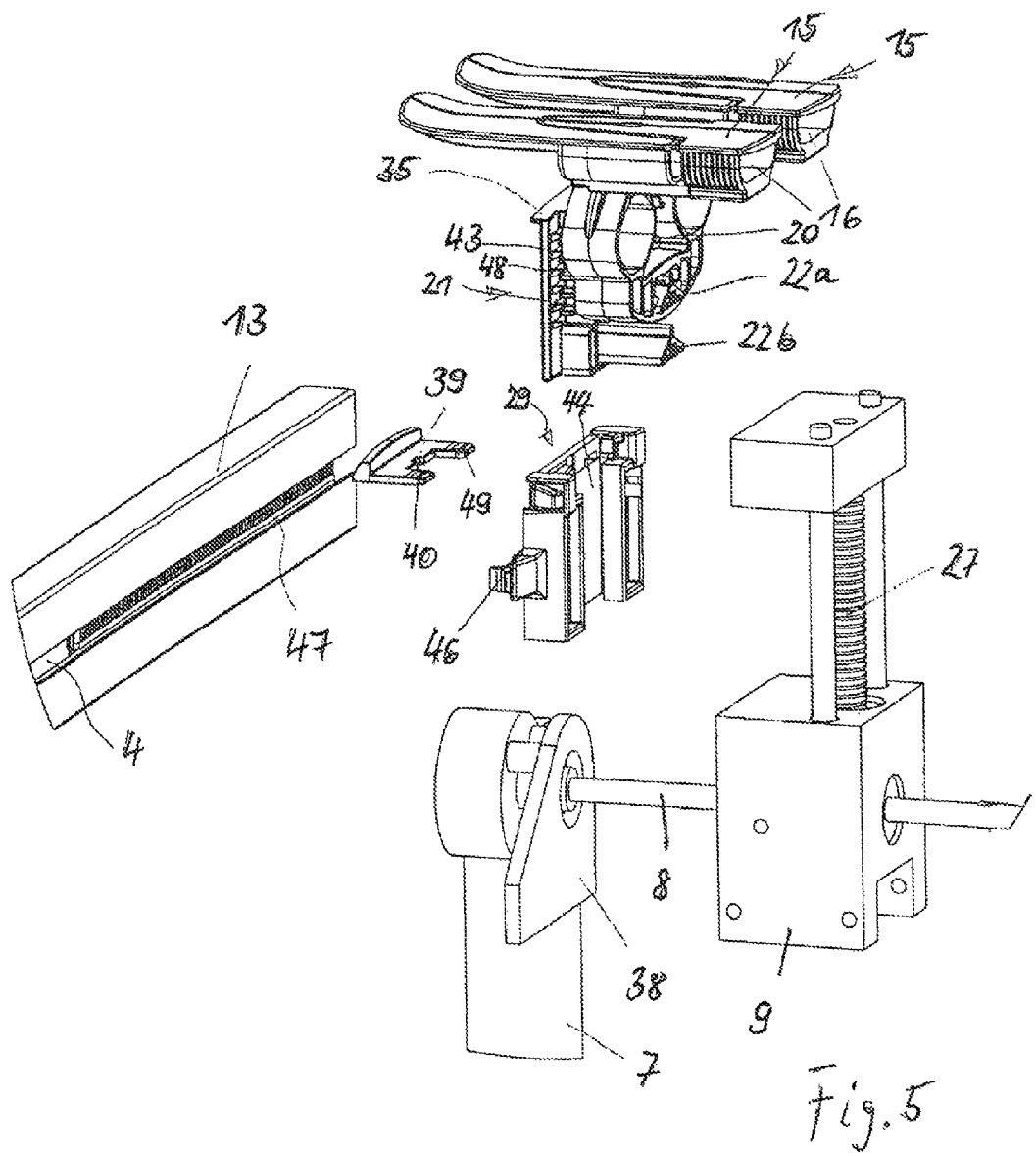
FIG. 5: shows a view rotated by an angular degree with respect to FIG. 4.

According to FIGS. 4 and 5, the lifting drive is formed from a lifting spindle 27, which is led parallel through two mutually longitudinally led lifting columns 49. The upper end of the lifting spindle 27 is accommodated in a guide block 23.

In the central region of the transverse brace 28, a number of measurement sensors 10 are arranged which lie behind one another and which form a visual alignment, said measurement sensors contactlessly determining the vertical deflection and downward deflection of the slat pair 12 lying thereabove.

Respective pairs of combined slats 12 comprise on their undersides a metallic measurement plate 14, which forms the measurement element for the measurement sensor 10 lying thereunder.

The horizontal longitudinal extent of the measurement plate 14 is selected to be so large that any desired position of displacement of the respective slat 12 in the Y direction generates a reliable signal in the measurement sensor 10 lying thereunder.

In this way, the deflection and downward deflection of the respective pair of slats 12 can be steplessly detected independent of the displacement position of the respective mounting body 21 which receives the slats 12.

Each end of the slat 12 is received in an insertion pocket 16 according to FIG. 2, and the insertion pocket 16 is a part of the bearing element 15.

The bearing element 15 thus respectively receives the free end of the slat 12, and a hardness adjustment element 17 is arranged at the inwardly oriented end of the bearing element 15, with which the slat hardness of the spring body 20 lying thereunder can be adjusted.

The mounting body 21 is a plastic part having two superimposed cones 22a, 22b. The upper pin 22a engages in an associated receiving opening 18 of the mounting body 21 and thus holds the spring body 20 fixed to the mounting body 21, while the lower pin 22b horizontally displaceably engages in a longitudinal guide 36 on the guide block 23 of the lifting apparatus which is oriented in the horizontal and the longitudinal direction of the longitudinal beam.

In this way, the entire mounting body 21 is displaceably supported in the guide block 23 of the lifting apparatus.

To the mounting body 21 further belongs a grid plate 43 which is fixedly connected therewith, in which grid plate are provided a number of mutually parallel horizontal slots 48 which are spaced apart from one another.

The grid plate 43 arranged on the mounting body 21 engages in the manner of a vertical longitudinal guide 44 in associated receiving grooves on the opposite part, which is designated as the clipping plate 29.

The downward displacement of the mounting body 21 in the longitudinal guide 44 of the grid plate 43 is limited by the stop 35. The stop 35 in this case is preferably arranged on the grid plate 43.

The clipping plate 29 thus forms a U-shaped vertical longitudinal guide which opens toward the back in the direction of the oppositely located grid plate 43, wherein this clipping plate in turn has a number of superimposed mutually engaging slots 42 which are spaced apart.

The clipping plate 29 accordingly consists of a longitudinally aligned clipping element 40, which is respectively limited to the left and right by locking hooks 60.

The locking hooks 60 are initially disengaged from the associated toothing in the region of the locking rail 47 within the guide groove 4 in the longitudinal beam 13.

In order to displace the clipping plate 29 into the guide groove 4, the snap closures 46 are first actuated by hand, in order to enable a stepless displacement.

After the establishment of the desired position, the snap closures 46 are released and the locking hooks 60 snap into the associated fixed position in the region of the toothing of the locking rail 47 arranged on the longitudinal beam side.

In this way, the horizontal displacement position of the clipping plate 29 is fixed on the respective longitudinal beam 13.

It is thus made clear that through the engagement of the pin 22b on the mounting body 21, a stepless horizontal displacement of the entire mounting body 21 occurs in the region of the guide block 23 of the lifting device.

At the same time, due to the longitudinal guide 44, the entire mounting body can be displaced in height by means of the lifting apparatus with respect to the clipping plate 29 fixed on the beam side.

Thus, it is possible for the first time to ensure a displacement of the mounting body 21 both in the X direction (directional arrow 50) and in the Y direction (directional arrow 51).

The drive shaft 8 is rotatably supported by guide sleeves 25 respectively extending in the transverse direction, wherein in this region is respectively provided a limit switch 37 in order to limit the lifting of the lifting spindle 27. It is thus prevented that the lifting spindle 27 falls out of its displacement guide into the angle gear 9.

The drive shaft 8 rotates, for example, in the direction of arrow 26, or in the opposite direction thereto.

The respective servomotor 7 is fixed to the bearing flange 38 on the inside of the longitudinal beam 13.

The clipping plate 29 is a plastic part, in the associated slots 42 of which the protruding pins 40 of the locking part 39 are releasably fixed. The locking part 39 comprises a front-side scale 41.

According to FIG. 4, a number of zero positions 59 are marked on the longitudinal beam side, said zero positions being mutually parallel and arranged at an equal or unequal spacing from one another.

A number of position indicators 55 are therefore displaceably arranged on the outer longitudinal beam 3 for marking the displacement position of the individual mounting body 21 in the longitudinal beam 3.

Each position indicator has an inner slot nut 57, which engages in an associated longitudinal groove 54 on the outer side of the outer longitudinal beam 3.

The slot nut 57 can be fixed in the longitudinal groove 54 by means of a knurled screw 56.

In the zero position, the indicator line 58 indicates the zero value of the scale 41 on the locking part 39.

Thus, any desired horizontal displacement position in the direction of arrows 50 of the respective mounting body 21, which accommodates the paired slats 12, can be repeatably read from the frame side.

In this way, during the test setup—see the general introduction of the specification—the mutual distances of the slat pairs can be individually adjusted to one another in the horizontal direction (direction of arrow 50), and the thus-read value is then read in comparison with the indicator line 58 at the associated scale value of the scale 41.

After the displacement of the position indicator 55 with a lying surface loaded by the subject, the subject then leaves the lying surface, and with an unloaded lying surface the mounting body 21 is now displaced through the engagement of the pin 22b in the longitudinal guide 36 on the guide block 23 in the direction of arrow 50, until the indicator line of the position indicator 55 again indicates the zero position of the scale 41 on the locking part 39.

Each position of the mutual spacing of the slat pairs is thus found.

An individual adjustment of the slat pairs in the horizontal direction (direction of arrow 50) which is thus produced on the measurement bed is then transferred to a slatted base which is individually adjustable to the subject, wherein the scale values are transferred to the scale 41 of a lying surface associated with the subject and a slatted base associated therewith.

Figure 7:
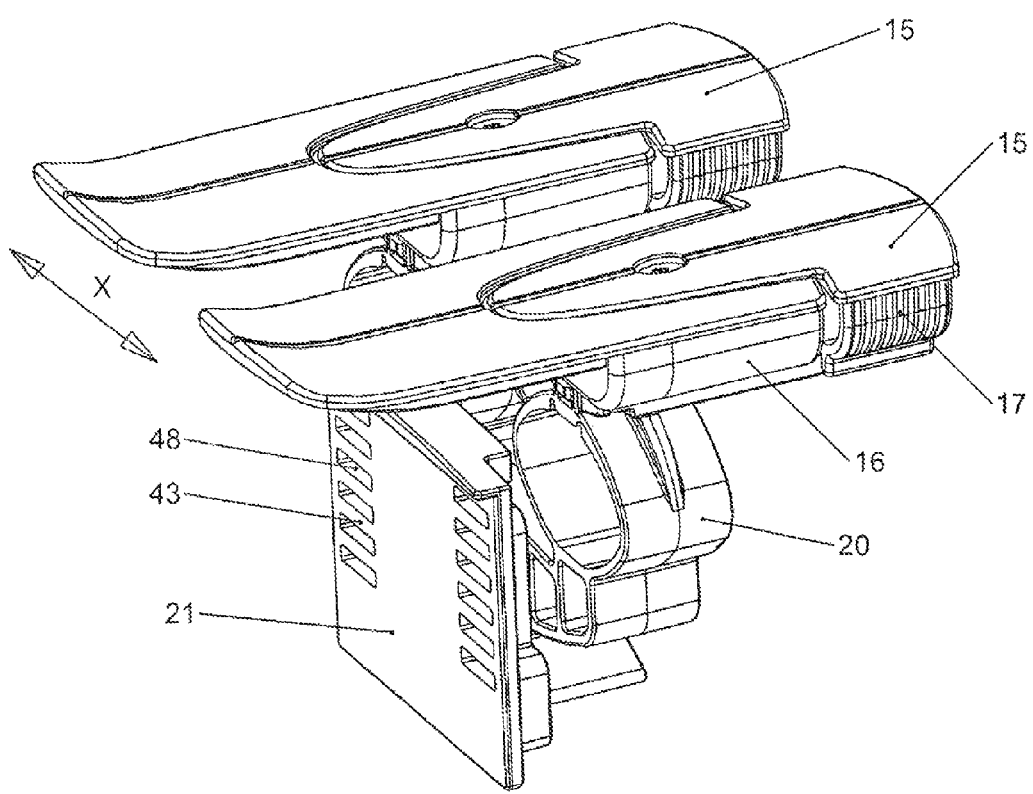
FIG. 7: shows a schematic representation of the mounting body without the stop.

FIG. 7 shows a further preferred embodiment, wherein the grid plate 43 does not have a stop 35.

The two pins 22a and 22b form a type of downward translation in the series frame. If one places the spring element 15 on the lower bolt, one thus obtains a deeper sinking of the slat pair than if only the pin 22a were present. It is crucial here that the mounting part 21 does not dip deeper than the lower edge of the clipping plate 29. This is an important prerequisite in series frames, so that no conflict may arise during insertion of the frame into different bedsteads.

This effect can be achieved in the embodiment according to the invention without a repositioning of the spring element 21, in that it is possible to sink the mounting plate 21 deeper. Here, the spring element 15 lies at position 22a.

Instead of the permitted five grids which are formed by the slots 48, the measurement bed travels continuously downward at all positions during a downward sinking, which arises from the manual translation by means of pins 22a and 22b.

LEGEND OF DRAWINGS

1 Measurement bed
2 Base frame
3 Outer longitudinal beam
4 Guide groove
5 Transverse beam
6 Transverse beam
7 Servomotor
8 Drive shaft
9 Angle gear
10 Measurement sensor
11 Connecting plate
12 Slat
13 Inner longitudinal beam
14 Measurement plate
15 Bearing element
16 Insertion pocket
17 Hardness adjustment element
18 Receiving opening
19
20 Spring body
21 Mounting body
22 Pin (of 21) a top, b bottom
23 Guide block
24
25 Guide sleeve
26 Directional arrow
27 Lifting spindle
28 Transverse brace
29 Clipping plate
30
31
32
33
34
35 Stop
36 Longitudinal guide (in 23)
37 Limit switch
38 Bearing flange
39 Locking part
40 Pin
41 Scale
42 Slot
43 Grid plate
44 Longitudinal guide
45 Clipping element
46 Snap closure
47 Locking rail
48 Slots (of 43)
49 Lifting column
50 Directional arrow
51 Directional arrow
52 Longitudinal beam
53 Strut
54 Longitudinal groove
55 Position indicator
56 Knurled screw
57 Slot nut
58 Indicator line
59 Zero position
60 Locking hook

The invention claimed is:

1. A slatted base comprising:
a bottom-side base frame;
slats held on two longitudinal sides of the slatted base, the slats being separated from one another in mutual horizontal adjustable and fixable distances;
a measuring device for detecting deformation of a lying surface under a load of a person lying thereon, wherein the measuring device detects vertical deflection of the slats;
a mounting body holding free ends of the slats;
a vertically oriented lifting drive having lifting spindle and a displaceable end that is engaged on the mounting body the vertically oriented lifting drive being supported with respect to the bottom-side base frame;
a longitudinal guide arranged in a directionally horizontal orientation on the mounting body; and
a guide pin engaging in the longitudinal guide, which is connected with a free, vertically displaceable end of the lifting spindle of the lifting drive.

2. The slatted base according to claim 1, wherein the free ends of the slats, which are provided in pairs, are respectively accommodated in an insertion pocket of a bearing element, and the bearing element is connected with the interposition of a spring body with the mounting body.

3. The slatted base according to claim 1, further comprising at least one pin arranged in a directionally horizontal orientation on the mounting body, the at least one pin displaceably engaging in the horizontal direction in a longitudinal guide of a guide block, which is connected with a free, vertically displaceable end of a lifting spindle of the lifting drive.

4. The slatted base according to claim 1, wherein the vertically displaceable guide between the lift-adjustable mounting body and the bottom-side base frame comprises a height-adjustable longitudinal guide comprising a grid plate fixed on the mounting body, and a clipping plate which is configured to be fixed on a frame side.

5. The slatted base according to claim 4, wherein the frame-side clipping plate is held displaceably and fixably in a guide groove on the inner longitudinal beam of the bottom-side base frame.

6. The slatted base according to claim 5, wherein the clipping plate is connected with a clipping element which engages in a guide groove, the clipping element being arranged on the hand-actuated locking hooks, which engage form-lockingly in the locked position in a toothing of a locking rail arranged in the guide groove.

7. The slatted base according to claim 1, further comprising a locking part fixed on the clipping plate, wherein the locking part supports a scale on a front side of the locking part which is associated with a displaceable position indicator on a frame side of the locking part.

8. The slatted base according to claim 7, wherein the position indicator has an indicator line oriented against the scale and is displaceably and fixably accommodated in a longitudinal groove on the outer longitudinal beam with a slot nut and a knurled screw interacting therewith.

\* \* \* \* \*